(12) United States Patent
Chappell (10) Patent No.: US 7,226,350 B1
(45) Date of Patent: *Jun. 5, 2007

(54) LOIN KNIFE Z-BLADES FOR USE WITH AUTOMATIC LOIN PULLER APPARATUS

(75) Inventor: David L. Chappell, Rushville, IL (US)

(73) Assignee: Hall Fabrication, Rushville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/556,791

(22) Filed: Nov. 6, 2006

Related U.S. Application Data (60) Continuation of application No. 11/469,633, filed on Sep. 1, 2006, which is a division of application No. 10/900,843, filed on Jul. 28, 2004, now Pat. No. 7,118,471.

(51) Int. Cl.
*A22C 18/00* (2006.01)
(52) U.S. Cl. ..................................................... 452/171
(58) Field of Classification Search ................ 452/171, 452/136, 156, 150, 134, 148, 157
See application file for complete search history.

(56) References Cited

U.S. PATENT DOCUMENTS

| | | | |
|---|---|---|---|
| 5,234,371 A * | 8/1993 | Andre et al. | 452/171 |
| 5,295,898 A * | 3/1994 | Andre et al. | 452/171 |
| 5,407,384 A * | 4/1995 | Boody et al. | 452/171 |
| 5,580,306 A | 12/1996 | Young et al. | |
| 5,882,252 A * | 3/1999 | Boody et al. | 452/171 |
| 6,089,968 A * | 7/2000 | Andre et al. | 452/171 |
| 6,155,919 A * | 12/2000 | Haagensen et al. | 452/171 |
| 6,547,658 B2 * | 4/2003 | Boody et al. | 452/171 |

* cited by examiner

*Primary Examiner*—Thomas Price
(74) *Attorney, Agent, or Firm*—McKee, Voorhees & Sease, P.L.C.

(57) ABSTRACT

Dual loin knife blade members, in the form of a Z-blade and two styles (tabbed and non-tabbed) of J-blades, for use with knife assemblies in loin pulling machines for pork processing operations. The Z-blade knife comprises a shelf portion of extended length, formed of two separately-shaped blade portions, to maximize to the allowable customer dimensional length specification for the meat shelf being cut, while not cutting into and exposing the red meat of the pork loin eye. The J-blade, of either the tabbed or non-tabbed style, includes lower sweeping radius blade portions allowing the J-blade to lie closely adjacent and generally conform to the profile of the underlying split conveyor belt bed shape. The profiles for the present Z-blades and J-blades permit substantially increased yield in pork loin processing operations, reduced subsequent hand-trimming labor, as well as extended blade wear. A method is also disclosed for manufacturing the Z-blades and J-blades, resulting in increased wear, less surface drag on blade-related components and minimizing premature tab breakage on the tabbed-style J-blades.

27 Claims, 6 Drawing Sheets

LOIN KNIFE Z-BLADES FOR USE WITH AUTOMATIC LOIN PULLER APPARATUS

CROSS-REFERENCE TO RELATED APPLICATIONS

This application is a Continuation application of U.S. application Ser. No. 11/469,633 filed Sep. 1, 2006, which application is a Divisional application of U.S. application Ser. No. 10/900,843 filed Jul. 28, 2004 (now U.S. Pat. No. 7,118,471 issued Oct. 10, 2006).

TECHNICAL FIELD

This invention relates to knife blades used in the meat processing industry, more particularly to knife blades used in loin knife assemblies of automated loin puller apparatus to separate the loin portion from the belly and fatback portions in pork carcasses.

BACKGROUND OF THE INVENTION

Automatic loin-pulling apparatuses have been developed over the years for removing excess fat and also the belly loin area of an animal carcass, i.e., as a step towards final cutting and packaging of the loin, belly, and fatback. Such automated loin pulling apparatuses include the devices disclosed in U.S. Pat. Nos. 6,089,968 and 6,547,658, for example, which disclose loin knife mechanisms for use with associated meat carcass processing machines. Some such knife apparatuses utilize bent knife blades, including dual blade assemblies.

There is an ongoing high volume of meat carcasses, e.g., pork carcasses, being processed every work day. Thus, an improper knife blade placement measuring only 0.1 inch, for example, can cause drastic loss in yields and price reductions in the belly, loin, and fatback portions, or increase further hand-trimming operations downstream. Thus, the individual loin knives must be carefully shaped, and also able to cleanly cut in a smooth fashion. Further, such blade assemblies must be formed so as to withstand hundreds of thousands of cuttings, e.g., 10,000 cuttings per day or more for multiple months, before needing replacement, so as to prevent costly downtime due to knife blade maintenance and/or change-out.

In the known dual blade loin knife assemblies of the prior art, see for example U.S. Pat. No. 6,547,658, there are two kinds of blades. First, there are so-called "Z-blades", operable to separate the loin portion from the belly portion of a hog carcass, as well as leave a so-called "belly shelf" and fingers of lean meat on the belly of a hog, for appearance and for superior bacon yields. Further, there are the so-called "J-blades," which work from the chine or backbone side of the carcass, used to separate the fatback portion from the loin portion.

However, due to the method of manufacturing such prior art blades, problems exist in the available normal cycles of usage of such blades, requiring relatively frequent machine downtime for blade replacement. Further, some meat processing machines necessitate that the J-blades have a so-called outwardly-extending "tab" portion, wherein an elongated diverter bar member is held by the tab member, as used to direct and position the trailing slab of fatback as it is cut from the pork carcass. As to such prior art "tabbed"-style J-blades, it has been found that those tab portions often break prematurely next to their welds, i.e. before the normal life of the tabbed J-blade has been used up.

Further, the shapes used for the so-called "belly shelf" cutting portions of the prior art Z-blades (as used for cutting a shelf through the longitudinal middle of the finger lean meat of the carcass) did not permit the resultant cut belly shelf to reach the customers' maximum permitted dimensional specification. Thus, unnecessarily large amounts of belly yield had to thereafter be removed off the loin portion, and they became less-desirable trimmings (which are then worth substantially less). Further yet, the prior art style of "J-blades" have, due to their specific shapes, left unusually large portions of excess fatback on the pulled loin portion of the loin middle, and hence also provided poor fatback yields. That, in turn, necessitates extra effort down-the-line in hand trimming operations, resulting in both extra labor costs, as well as a reduced amount of "good" (i.e. connected) fatback, i.e. which is desirable due to the higher price received for sales of the trimmed fatback portion of the carcass when sold as one piece.

More specifically, meat processors using such dual blade loin knife-type machines require that a satisfactorily "belly shelf" cut be made by the Z-blade, i.e. one that both falls within their dimensional specifications (typically some 2.5 inches±0.2 inches in length) and which also gets sufficient "fingers of lean" meat (found on the back side of the bacon, for good bacon yield), yet which blades also do not cut into or otherwise expose the loin eye meat (which would reduce the value of that select cut of meat). Further, most customers of the cut and pulled pork loins have a specification for their processors that permit no more than one-quarter inch of fat cover on the loin meat. Thus, there is a need to be able to trim the fatback over the loin as close as possible to the loin eye meat, yet again without cutting into and exposing the same.

Further, there has been an inability with the prior art types of J-blades to be adjusted sufficiently vertically, i.e. to be moved substantially down close to the split conveyor belt bed relative to the meat carcass, due to their specific blade configuration. This inability to closely adjust to the bed profile created substantial yield loss for such prior J-blades. This was especially the case when such prior J-blades where used in a meat processing plant which was running so-called "European White" hogs, as those type of pork carcasses have very little fat, and the red meat portions are located substantially close to the skin. Thus, the prior J-blades were not of a shape that could be adjusted effectively relative to the conveyor belts, and thus, they could not run at desirable high yield rates, for processing such "European White" hogs.

Further yet, some processing customers require at the so-called "shoulder end" of the loin portion of the carcass, where some amount of so-called "false lean" meat is present, that the majority of such false lean stay on the loin, yet they also want a small portion of such false lean to stay on the belly, so as to have sufficient meat in the remaining bacon portion.

Additional problems with the known prior art dual blades include that they are formed with relatively rough surfaces that create a substantial amount of cutting drag through the carcass. This in turn places substantial side loads on the loin puller machine's blade-related components, such as the bushings, linkage parts, blade-holding components, and bearings. Thus, such blade-related components often require early replacement, necessitating machine downtime. Also, if such worn components are not properly replaced, then due to the end-play that they create, there are yet additional yield losses, broken carcass bones, and improper meat cutting, resulting then in yet additional lost revenue.

Thus, there has been a need for improved "Z-blades" and "J-blades" for use in meat production operations, especially for use in pulling loins in pork carcass processing plants.

BRIEF SUMMARY OF THE INVENTION

There is disclosed as one aspect of the present disclosure a Z-blade member having a cut belly shelf formed of an extended length, to consistently reach the maximum end of the customer-set dimensional specification for that shelf. That shelf blade portion is formed of two distinct sections, the first being a generally straight section adapted to cut and divide the finger lean meat as close as possible to the spare rib around the pork middle, and a second further generally straight section, but formed at a shallow angle canted down from the first shelf portion and adapted to operate as sufficiently low as needed to avoid cutting into any of the red meat portion of the loin eye, whether as a small "pencil score" or as a large "body score", in view of the significant extended length of that shelf portion of the Z-blade.

Another aspect of the present invention, as an alternate form, provides a Z-blade also having a shelf portion of extended length, again to regularly reach the customer's maximum belly shelf dimension specification, but formed of a gradual sweeping curve shape, rather than two straight sections divided by an intervening shallow angle. Again, the first part of the curve of the shelf is adapted to cut out the finger lean meat close to the spare rib as possible, while the second portion of the curve of the shelf is adapted to cut close to, yet stay sufficiently distant from so as not to score, the loin eye meat.

Additionally, as another aspect of the disclosure, there is a J-blade member formed so as to have an initial meat cutting blade portion that is substantially straight and formed at a tight upright angle, so as to closely trim the "saddle area" of the fatback from adjacent the loin without overexposing the false lean from the shoulder end or "overscoring" the ham end (but still creating a desired "silver dollar"-size ham end score). Further, there is a lower sweeping curve portion, formed of a tight radius adapted to closely match the shape of the conveyor bed, so as to allow the blade to be adjusted closely adjacent the same, thereby resulting in increased yield.

Another aspect of the disclosure is a modified form of the J-blade, for use with machines that require a diverter bar tab member to be present, where the tab is so formed as to minimize its premature breakage before the blade is otherwise normally used up.

Further aspects of the disclosure include a method of forming Z-blades and J-blades for a pork loin puller apparatus resulting in a substantially extended useful life for such blades, a substantial elimination of the welded tab breakage problem of the prior art, and with polishing of the blade surface, resulting in a substantial reduction in side loads on the blade-holders and other blade-related components.

Yet a further aspect of the disclosure is a method for forming both Z-blades and J-blades for meat carcass processing operations, where the resulting blades provide increased yields of loin, belly, and fatback, resulting in increased revenues, minimize hand-trimming operations, and have a substantially increased overall useful life compared to prior art dual loin knife blades.

BRIEF DESCRIPTION OF THE DRAWINGS

The means by which the foregoing other aspects of the present invention are accomplished, and the manner of their accomplishment will be readily understood from the following specification upon reference to the accompanying drawings, in which.

DETAILED DESCRIPTION OF THE PREFERRED EMBODIMENT

The present disclosure relates to dual loin knife blades that provide improved processing operating efficiencies and yields over the prior forms of Z-blades and J-blades as disclosed in U.S. Pat. No. 6,547,658, and further overcomes many of the deficiencies found in the blades, and their shapes and manufacturing methods.

Figures 1, 5:
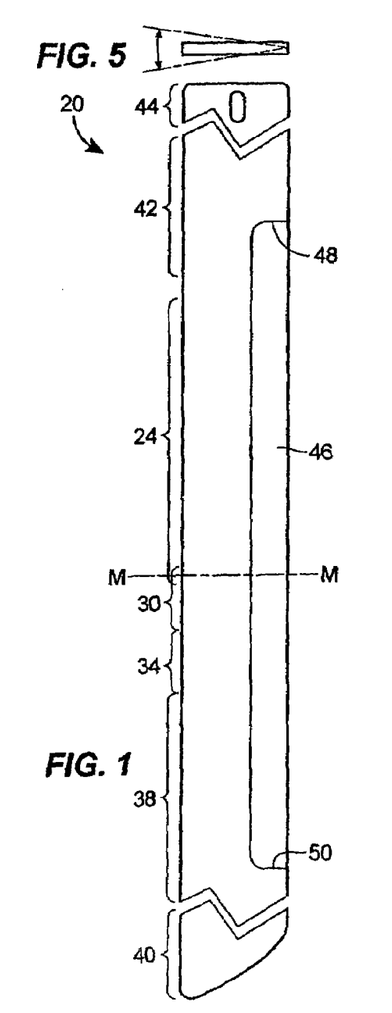
FIG. 1 is a front elevation view of a Z-blade of the present disclosure.
FIG. 5 is similar to FIGS. 3 and 4, but depicts a double bevel cutting edge for a Z-blade.

Having reference to the drawings, wherein like reference numerals indicate corresponding elements, there is shown in FIG. 1 an illustration of a Z-blade member, generally denoted by reference 20. Z-blade 20 includes (from top to bottom in that Figure): an upper mounting portion, generally denoted by region reference 22; an upper central blade portion 24; an angle bend forming a rib bone radius portion 26; a shelf portion 28 comprising an upper initial or finger shelf portion 30, a relatively short shallow-angled shelf bend portion 32, and a lower or loin eye avoidance shelf portion 34 (hereafter the "LAS portion"); an angle bend forming a belly cutoff radius 36; a belly cutoff blade portion 38; and a lower mount portion 40. Portions 28, 30, 32, 34, 36 and 38, collectively, form a lower central blade portion.

More specifically, the upper mounting portion 22 of Z-blade 20 comprises an S curve portion 42 and an upper mount portion 44 which mounts to a loin puller apparatus' upper blade mount (not shown). It will be understood that, depending on the specific mounting block arrangement and location (not shown) present in a given loin pulling machine (not shown), there may be a need for an even larger (or smaller) S curve portion, or instead, no need at all for the linkage-adjusting S curve portion 42 of Z-blade 20. Instead, portion 42 and upper mount portion 44 can simply be formed as an elongated straight mounting section of Z-blade 20, or even take some other configuration, again depending on the specific upper mounting requirements for the Z-blade in a given application.

Figure 2:
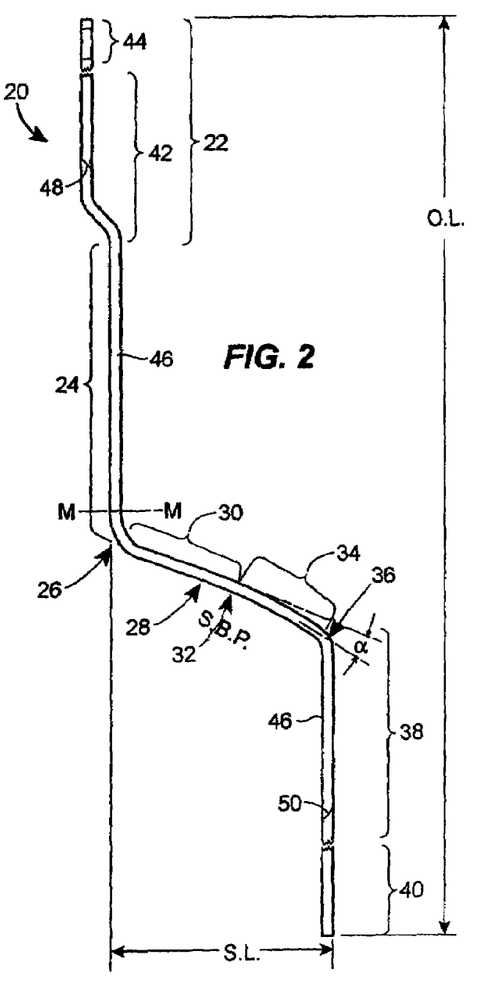
FIG. 2 is a side elevation view of the Z-blade of FIG. 1.
Figure 3:
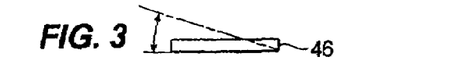
FIG. 3 is a cross-sectional view, taken along lines 3—3/4—4 of FIG. 1, reflecting a single bevel cutting edge, and shown as a right-hand blade.
Figure 4:
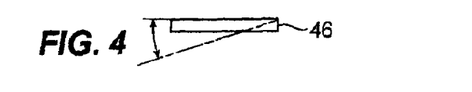
FIG. 4 is a cross-sectional view, taken along lines 3—3/4—4 of FIG. 1, reflecting a single bevel cutting edge, and shown as a left-hand blade.

As seen in FIGS. 1 and 2, the cutting edge 46 runs from an upper end point 48 to a lower end point 50. Those end points 48, 50 may be readily extended upwardly and downwardly as needed for a given loin puller machine, depending on the type and size (i.e. live weights) of hog carcass being processed. Further, cutting edge 46 can be formed with either an inner or outer single beveled cutting edge, such as shown in FIGS. 3 and 4, or instead, can be formed as a double bevel cutting edge, as shown in FIG. 5, depending on the preference of the customer. In FIG. 2, cutting edge 46 is shown as an inner single bevel cutting edge (but again, that type edge is depicted merely for purposes of presentation).

Upper central blade portion 24 is shown as a generally elongated straight section ending at its lower end in the rib bone radius 26. It will be understood that upper straight blade portion 24 is positioned substantially above the entry point of the meat carcass into the blade (such point being shown as line M—M in FIG. 2). Nevertheless, blade portion 24 still carries a cutting edge 46, primarily so that if any carcasses are improperly aligned within the loin pulling machine (not shown), the cutting edge 46 will be present to cut through the bones and meat, so that such mis-aligned carcass section does not jam up the machine and cause unwanted downtime.

The angle of the rib bone radius 26 is quite tight, and thus, relative to now the lower central blade portion, sets up an aggressive positioning of the shelf portion 28 towards the loin area, as compared to that angle in the known prior art blades, which instead typically had much larger radii, such as 114°. That is, the angle of the present rib bone radius 26 is preferably in the range from approximately 107° to 111°, and more preferably is approximately 109°.

The permitted length of a cut belly shelf on a loin is typically specified by the end user customers to be 2.5 inches plus or minus 0.2 inch. The prior art Z-blades, however, purposely had only a 2.5 inch maximum shelf length. However, with the present invention, the shelf length (designated as length S.L. in FIG. 2) for the elongated shelf portion 28 is 2.7 inches, and therefore is able to cut deeper into the belly area and near the loin eye meat. That resultant elongated length of cut belly shelf thereby increases the overall weight of the loin portion, with resultant increased revenues for the processors. However, if such an extended shelf length S.L. of 2.7 inches were undertaken with a straight shelf blade design, such as present in the known prior art Z-blades, that extended straight blade length would improperly cut right into the loin eye meat.

Advantageously, the present shelf 28 has been formed of two sections, namely an upper, initial finger shelf portion 30, which is formed preferably as a straight section extending approximately 0.680 inch in length, and within a preferred range from approximately 0.650 to 0.710 inch in length, and then the second shelf or LAS section 34, i.e. the loin avoidance shelf portion, which is also formed preferably as a straight section having a length of approximately 0.561 inch, and within a preferred range from approximately 0.531 to 0.591 inch in length. Formed between those two shelf portions 30 and 34 is a bend angle portion 32 having a shallow bend angle $\alpha$ in the range of approximately 9° to 13°, and preferably approximately 11.2°. The radius to create angle $\alpha$ is approximately 4.8845 to 4.9445 inches, and preferably 4.9145 inches. Angle $\alpha$ allows the LAS blade portion 34 to cant down slightly from the upper finger shelf portion 30. It will be understood that if angle $\alpha$ is made too great, than the belly yield can be lost, i.e., the depth of the edge of the belly is no larger as much as the customer-required depth specification of one-half inch minimum, thereby necessitating additional trimming labor to cut back the belly shelf towards the spare rib, until the required one-half inch depth dimension is again attained. On the other hand, if angle $\alpha$ is made too small, then there is a risk of exposing and cutting into the loin eye meat by the LAS section 34. Thus, by using a bend angle $\alpha$ within the above range, for the extended shelf S.L., that angle $\alpha$ allows the LAS portion 34 completely to avoid interference with the red meat of the loin eye. Thus, the two-part extended length shelf 28, with intervening angle $\alpha$ of bend portion 32, is a substantial improvement over the straight shelves of the prior art Z-blades, because an extended shelf length of meat can now be cut, including cutting closer to the spare rib and through the finger lean, yet without cutting into the loin eye meat. This extended length shelf results in substantial yield gains of the loin portions for the meat processor.

As seen in FIG. 2, the cutoff radius 36 has a tight angle bend created by a radius in the range from approximately 0.220 to 0.280 inches, and more preferably of approximately 0.2500 inch. The angle between the lower shelf portion 34, relative to the belly cutoff blade portion 38, is formed within the range of approximately 117.2° and 121.8°, and preferably approximately 119.5°. The belly cutoff blade portion 38 is thus formed as a substantially vertical portion including the cutting edge 46 and lower end point 50, and is operable to cutoff the fatback from the belly of the pork carcass. The lower mounting portion 40 mounts within the lower mounting block (not shown) of the associated loin pulling machine (not shown); again, it can take any of several forms as needed to be held properly by such mounting blocks. Thus, the shape shown for lower mounting portion 40 in FIGS. 1 and 2 is merely for purposes of illustration.

The overall length (designated as length O.L. in FIG. 2), for the Z-blade of the present disclosure is normally in the range from approximately 13⅞ inches to 14⅛ inches, and is preferably some 14 inches long, as measured in its finally formed shape. The range of thickness for the Z-blade 20 is in the preferred range from approximately 0.130 inches to 0.150 inches, and is preferably 0.140 inches. As noted, the upper central blade portion 24 and belly cutoff blade portion 38 are generally parallel to one another. As an alternate form of two section shelf 28, it could be formed as one continuous downwardly curved section, formed of a radius of preferably 7.287 inches, and within the preferred range from 7.257 inches to 7.317 inches. Such a curved shelf blade portion of the extended 2.7 inch length is a substantial improvement over prior art shelf blade portions.

Figure 6:
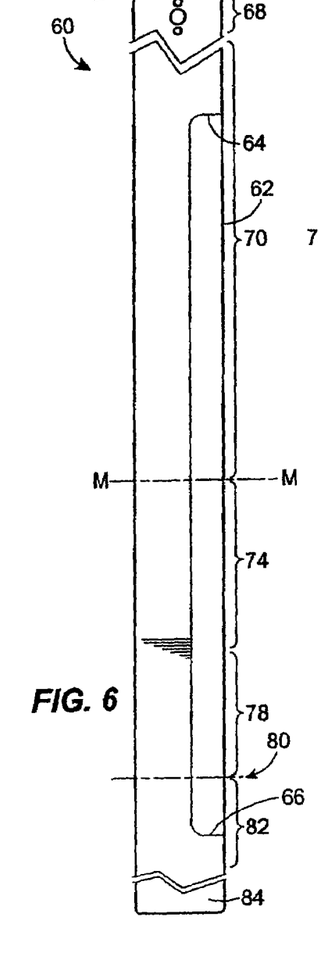
FIG. 6 is a front elevation view of a J-blade of the present disclosure.
Figures 7, 8, 9:
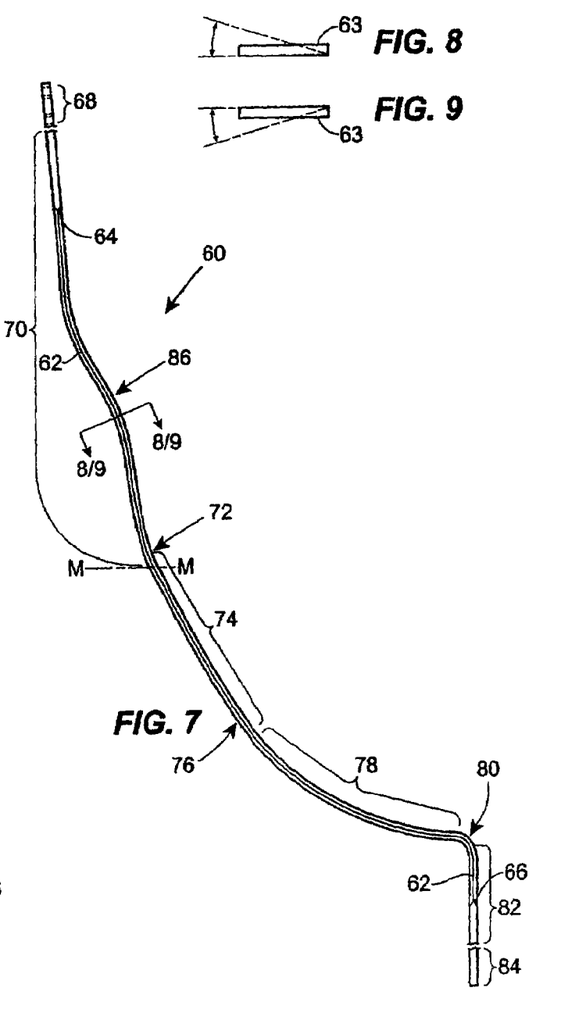
FIG. 7 is a side elevation view of the J-blade of FIG. 6 (configured as a left-hand blade.
FIG. 8 is a cross-sectional view, taken along lines 8—8/9—9 of FIG. 7, reflecting a single bevel cutting edge, and shown as a left-hand blade.
FIG. 9 is a cross-sectional view, taken along lines 8—8/9—9 of FIG. 7, reflecting a single bevel cutting edge, but shown as a right-hand blade.

Turning to FIGS. 6 and 7, there is shown as one aspect of the present disclosure, an improved J-blade, generally denoted by reference numeral 60, and for use with certain types of loin puller machines. That is, certain loin puller apparatus (not shown) were modified into dual blade machines in the field, i.e. converted from a single hoop-style blade machine to a dual blade loin knife-type machine. Due to such field modifications, including the style and location of the specific blade mounting blocks used, and the other components found in those type loin puller machines, the J-blades used with those field-modified machines are necessarily formed of a specific shape. Thus, the improved J-blade 60 for use with such field-modified machines includes a dual bevel cutting edge 62 (used for presentation purposes only in this disclosure, and again is dependent on the end user's preference), having respective upper and lower end points 64, 66. J-blade 60 includes (from top to bottom in those Figures): an upper mount portion 68; an upper central blade portion 70; a rib bone radius 72; a lower central blade portion having generally straight fatback trimming portion 74, a transition area 76, and a sweeping radius portion 78; a cutoff angle bend 80; a generally straight cutoff portion 82; and a lower blade mount portion 84.

More specifically, the upper central blade portion 70 comprises an S-curve portion 86 which helps properly position the upper mount portion 68 in its needed linkage position. That is, the S-curve portion 86 helps as a linkage step to properly locate (from left to right in FIG. 7) the upper mount portion 68 relative to the upper mounting block (not shown) of an associated field-modified loin puller machine (not shown). Thus, again here, similar to the above-described Z-blade, the blade portions 68 and 70 can take other shapes rather than the S-curve portion 86, as needed to accommodate the proper linkage positioning with the upper blade mounting blocks.

The feather bone radius 72 is preferably in the preferred range from 0.220 to 0.280 inches, and more preferably is approximately 0.2500 inch. That relatively tight radius allows the straight fatback trim portion 74 of the disclosed improved J-blade 60 to be aggressively positioned (i.e. in a fairly vertical alignment and quite close to, i.e. tighter into against, the feather bones (not shown) of the pork carcass), than was ever previously available with the prior art J-blades. Preferably, the relative length of the straight fatback trim portion 74 is approximately 2.079 inches long and within the preferred range of approximately 2.049 to 2.109. Further, it will be understood that the prior art blades were formed of a flat curve along that fatback trim portion of the overall J-blade, rather than substantially straight as formed with the fatback trim portion 74 of the disclosed J-blade 60. By having such a straight blade portion for fatback trim portion 74, the result is that less overall fat remains on the loin portion that is pulled, and instead, more fat is cut into the fatback portion that is trimmed away. This results in better yields, and hence, in better revenues for those respective sections of the carcass when sold.

There is a small transition area 76 located between the generally straight fatback trim portion 74 and the sweeping radius portion 78 of J-blade 60. The radius for the sweeping radius portion 78 is much more aggressive, i.e. is much tighter, than that present in the prior art J-blades. That is, the radius in area 78 is preferably in the range from approximately 3.939 inches to 3.999 inches, and more preferably is approximately 3.9691 inch. The sweeping radius portion 78 of J-blade 60 operates to remove the fatback over the loin eye, and thus, that tight radius blade portion causes a smaller thickness of fat cover (not shown) to remain over the loin eye, yet that portion 78 does not enter the red meat of the loin eye. For example, the most aggressive radius present in the known prior art fatback blade portions was relatively flat, i.e. only approximately 4.117 inches, such that that relatively flat radius inherently created a substantial yield loss in the fatback trim portion of the carcass. The tight sweeping radius of present blade portion 78 then transitions into, and comes down low towards belt bed, due to the sharp cutoff angle bend 80. That sharp bend 80 has a preferred radius of only approximately 1.875 inch, and is within a preferred range of only approximately 0.1575 inch to 0.2175 inch. The angle between the sweeping radius portion 78 relative to the cutoff portion 82, is formed within the range of approximately 83.9° and 88.5°, and preferably 86.2.

Stated another way, the fatback trim portion 74 comprises approximately the first two fifths of the meat cutting portion of the J-blade 60, and the lower sweeping radius portion 78 comprises approximately the lower remaining three fifths. This aggressive shape, thus, trims the fatback over the loin eye very close in with a tight radius, and puts the blade quite close to the red meat portion of the loin, resulting in a larger piece of fatback that is now worth more, since it contains more connected weight. Further, the resulting loin is thus formed to be of a very first quality, since it has only the minimal dimensional specification of remaining fat cover. If the overall meat cutting portions of the blade (i.e. portions 74 and 78) were formed too tight, i.e. too close in against the loin eye, then they would expose the loin red meat, which then drops the quality and price of the loin. On the other hand, if those blade portions 74, 78 were formed to be too loose or wide, then there is less fatback trimmed off, such that too much fat is left on the loin. That, in turn requires extra and costly subsequent "hand knife" labor for trimming away that extra fatback. In effect, the tight radius of cutoff angle bend 80 allows the sweeping radius portion 78 to start right away at its lower end, such that the sweeping radius portion 78 gets up close into the loin eye area, and thereby, in effect, allows the greatest recovery of the fatback.

Figure 10:
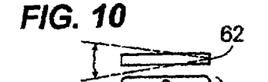
FIG. 10 is similar to FIGS. 8 and 9, but depicts a double bevel cutting edge for a J-blade.

It will be noted that FIGS. 8, 9 and 10, disclose, respectively, inner and outer single bevel cutting edges 63, and a dual bevel cutting edge 62.

Figures 11, 15:
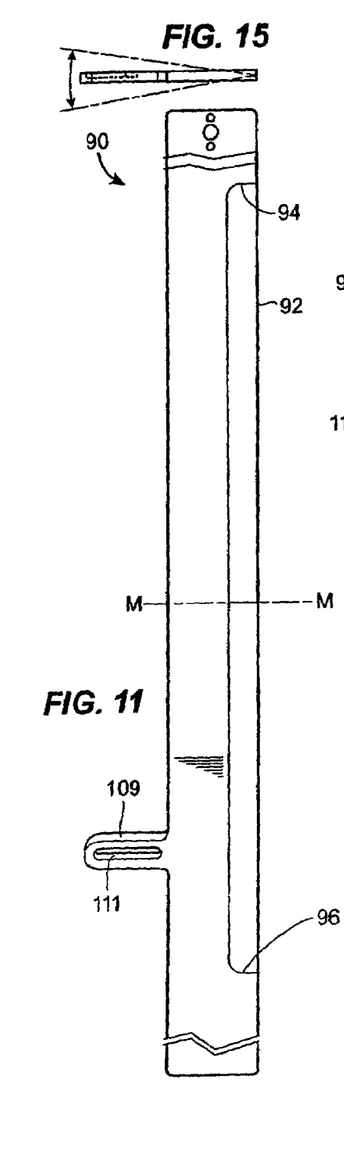
FIG. 11 is a front elevation view of an alternate form of the J-blade, namely a tabbed-style J-blade.
FIG. 15 is similar to FIGS. 13 and 14, but depicts a double bevel cutting edge for the tabbed-style J-blade.
Figure 12:
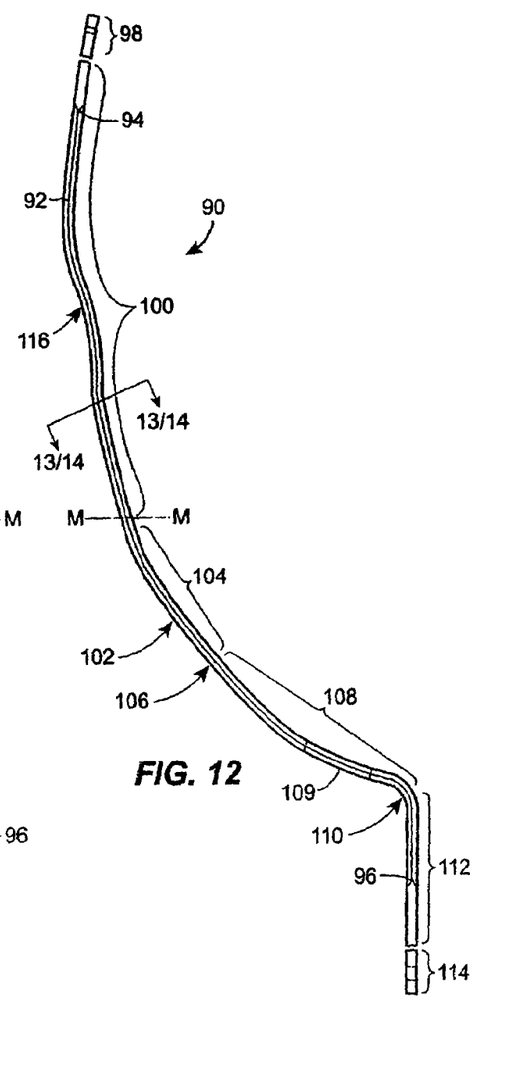
FIG. 12 is a side elevation view of the tabbed-style J-blade of FIG. 11.
Figure 13:
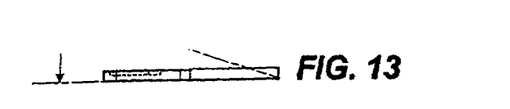
FIG. 13 is a cross-sectional view, taken along lines 13—13/14—14 of FIG. 11, reflecting a single bevel cutting edge, and shown as a right-hand blade.
Figure 14:
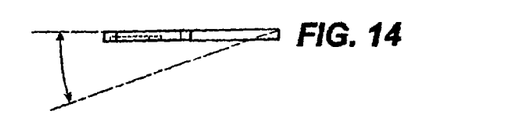
FIG. 14 is a cross-sectional view, taken along lines 13—13/14—14 of FIG. 11, reflecting a single bevel cutting edge, and shown as a left-hand blade.

Shown in FIGS. 11 and 12, as an alternate aspect of the present disclosure, is a modified form of a J-blade for use with those certain different types of loin puller processing machines that need a tab for holding a diverter bar, and which machines are otherwise different from the machines which utilize the style of J-blade 60 of FIGS. 6 and 7.

Thus, there is shown in FIGS. 11 and 12, an improved tabbed-style J-blade, as generally denoted by reference numeral 90. Tabbed J-blade 90 includes a dual bevel cutting edge 92 with respective upper and lower end points 94, 96. The tabbed J-blade 90 includes (from top to bottom in FIG. 12): an upper mount portion 98; an upper central blade portion 100, which extends generally down to that point along tabbed blade 90 as designated by carcass entry line M—M, i.e. the line at approximately which the top of the pork carcass enters the blade; an elongated sweeping curve portion, generally designated by reference numeral 102, which includes two separate blade portions, namely a tight upper radius or fatback trim portion 104, as separated by a transition area 106, and a tight lower radius or sweep radius portion 108 (which carries the integrally-formed tab member 109, as having an inner opening 111 to hold and retain the associated diverter bar (not shown)); a cutoff angle bend 110; a generally vertical cutoff blade portion 112; and finally, a lower mount portion 114.

More specifically, the upper central portion 100 includes a generally shallow S-curve portion 116 which, along with the upper mount portion 98, can be larger or smaller (as needed) and provides the proper positioning and linkage setup for mounting the upper end of the J-blade 90 to the mounting blocks (not shown) of the loin puller machines (not shown). Again, as with the similar portion of the above-described Z-blade 20 and J-blade 60, the upper portions 98 and 100 of tabbed J-blade 90 can be formed in different configurations, as needed, to accommodate the upper mounting block for a given loin puller machine (not shown). However, starting from essentially carcass entry line M—M on down, the shapes of the various blade portions for tabbed J-blade 90 are specially formed. The upper fatback trim portion 104 is preferably formed of a radius in the range of approximately 3.970 inches to 4.030 inches, and more preferably is of approximately 4.0 inches. This tight curvature for upper fatback trim portion 104 permits the blade 90 at that location to properly divide and trim the finger lean portions and to cut near the feather bone area of the loin, but without cutting into the loin eye meat. Then, after the transition area 106, the separate and different radius of the lower sweep radius portion 108 is within the range from approximately 3.470 inches to 3.530 inches, and more preferably, is of approximately 3.5 inches. As seen, those two respective and distinct radiuses blend into one another along the transition area 106. The cutoff angle bend 110 is preferably formed of a tight radius of approximately 0.360 inch, and within a preferred range of from 0.330 inch to 0.390 inch.

While it is of a slightly different overall shape from the corresponding portions of non-tabbed J-blade 60 (of FIGS. 6 and 7), the lower meat cutting portions 104 and 108 of the tabbed J-blade 90 are still substantially more aggressive, i.e. tighter in towards the feather bones and loin eye meat, than any of the known prior art tabbed-style J-blade designs. In effect, the curved cutting portions 104 and 108 permit substantially more fatback to be trimmed from the loin meat areas, and thus, add back an otherwise lost portion of the fatback segment, thereby substantially increasing yields, over the prior art tabbed-style J-blade.

Figure 16:
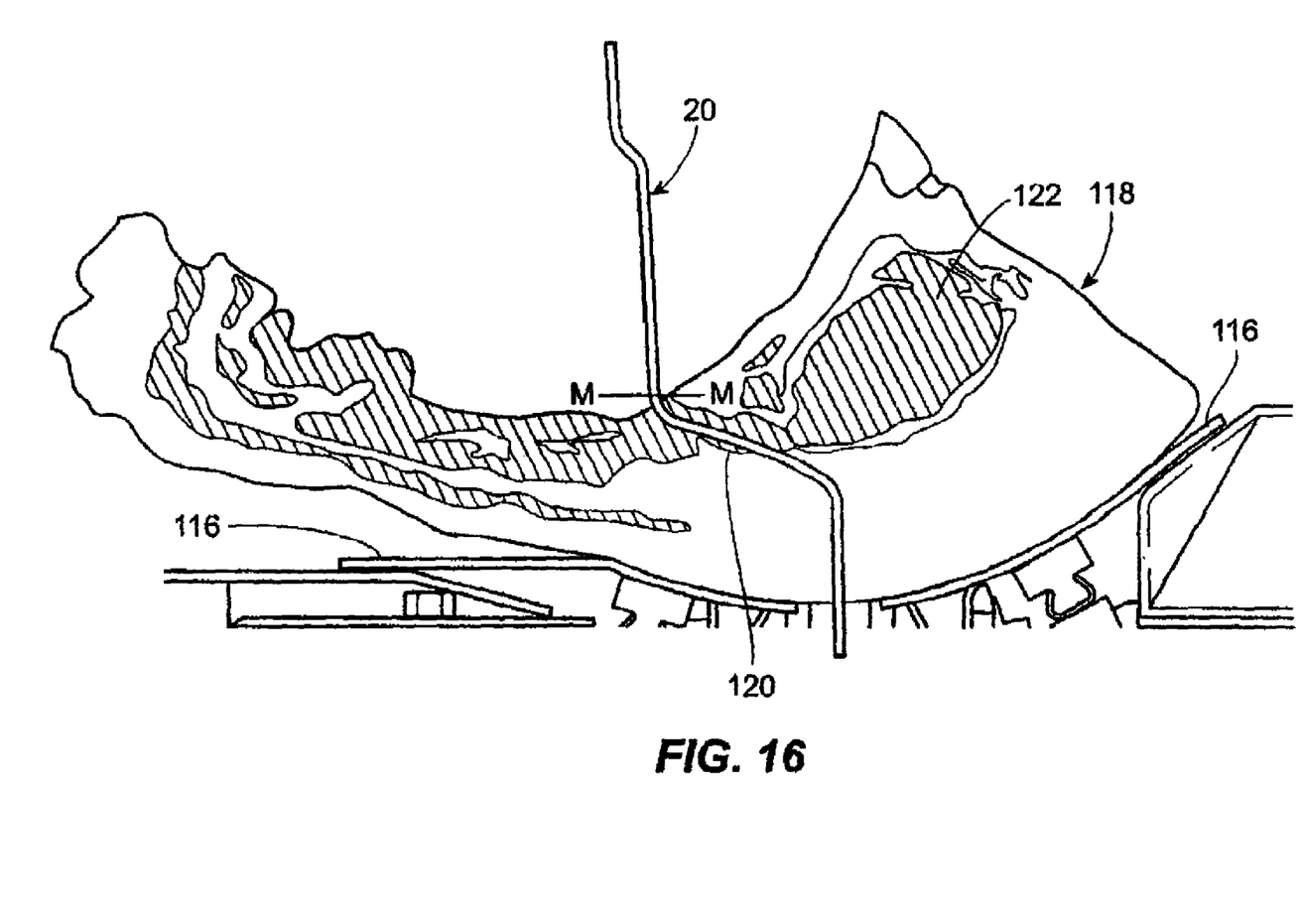
FIG. 16 is an enlarged view of the Z-blade of FIG. 1, shown as a left-handed blade in its operational environment above an associated conveyor bed, and a loin meat carcass (shown at its shoulder end)

As shown in FIG. 16, the Z-blade 20 of the present disclosure is depicted in its normal operating environment, namely in operation above a split conveyor belt-type bed 116, as shown carrying the shoulder end of the pork loin, generally depicted by reference numeral 118. As seen, the shelf portion 28 properly cuts the finger lean meat 120 yet does not get too close to the loin meat 112. However, as will be understood, the Z-blade 20 is formed so as to leave a proper "silver dollar"-sized score (not shown) on the belly.

Figure 17:
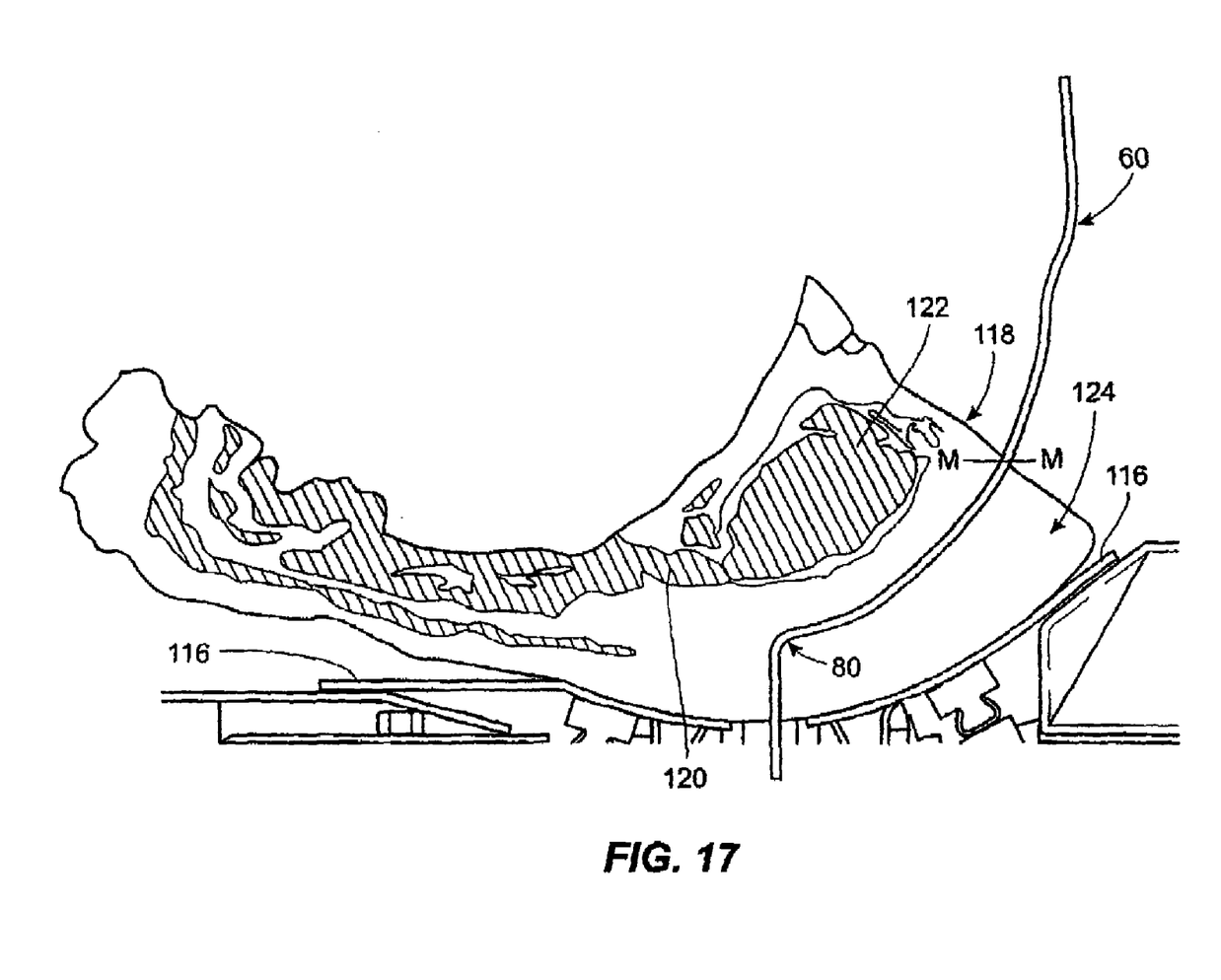
FIG. 17 is an enlarged view of the J-blade of FIG. 6, shown as a left-handed blade in its operational environment above an associated conveyor bed, and a loin meat carcass (shown at its shoulder end)

Turning to FIG. 17, there is shown, in the operating environment similar to FIG. 16, the non-tabbed J-blade 60 of the present disclosure, including the split conveyor belt bed 116 and the carcass shoulder end 118. As seen, the sweeping radius portion 78 of non-tabbed J-blade 60 mirrors, i.e. is shaped to closely follow, the overall profile of the belt bed 116. Thus, when needed the blade, in effect, is allowed to lay down directly onto the belt bed, as it were, so as to be able to closely trim the loin shoulder end 118. This blade profile-mirrors-bed profile feature is particularly advantageous when pulling loins of so-called "European White" hog carcasses, yet can be accomplished without at all cutting into the belt bed 116. In effect, when blade 60 is so lowered, there is no "air gap" left between the profile of the lower sweeping radius portion 78 and the belt bed 116. This blade profile-mirrors-bed profile feature is further accentuated by the fact that the radius formed in cutoff angle bend 80 of non-tabbed J-blade 60 is substantially sharp. Thus, a substantially greater amount of fatback 124 can be cut away by the aggressive shape of the meat cutting portions of non-tabbed J-blade 60. Further, the specific configuration of J-blade 60 will not over-expose false lean at the shoulder end or over-score the ham end of the loin.

Figure 18:
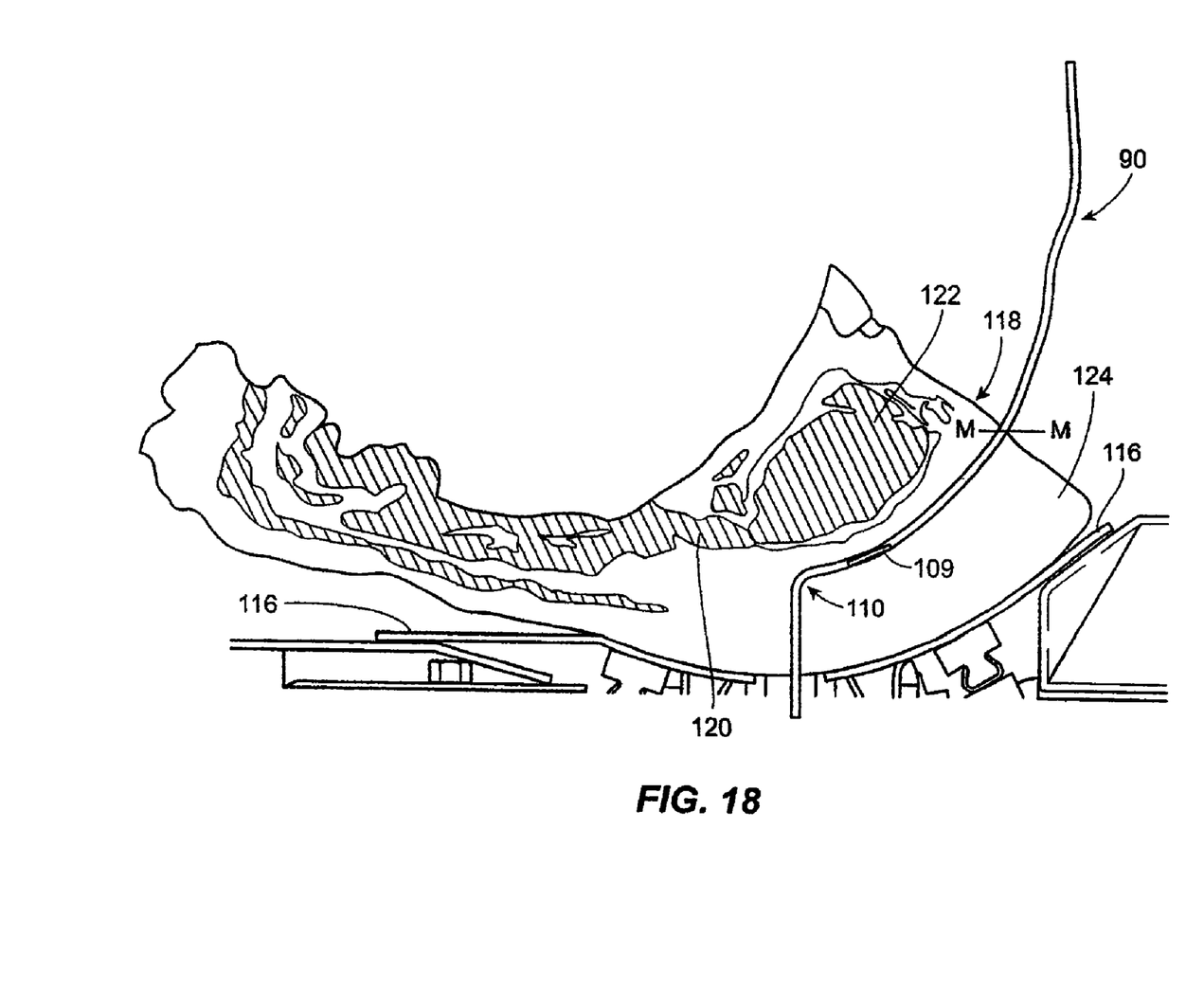
FIG. 18 is an enlarged view of the alternate tabbed-type J-blade of FIG. 11, shown as a left-handed blade in its operational environment with an associated conveyor bed and a loin meat carcass (shown at its shoulder end).

Turning to FIG. 18, there is shown the tabbed J-blade 90 of the present disclosure as depicted in its operating environment (similar to FIGS. 16 and 17), and again depicting the split conveyor belt bed 116 and the loin shoulder end 118. As noted, the angle of the cutoff angle bend 110 is not quite as sharp, i.e. not as tight (as the corresponding angle of cutoff angle bend 80 of non-tabbed J-blade 60). Nevertheless, the lower sweep radius portion 108 of tabbed J-blade 90 is still able to come down substantially close to, and have a generally similar profile to, the conveyor belt bed 116. Thus, here again, and contrary to the prior art tabbed J-blade designs, a substantial greater portion of the fatback 124 of the carcass is able to be cut away from the loin 122, all so as to in increase both loin and fatback yields when using the tabbed J-blade 90 of the present disclosure. Further yet, the tabbed-style J-blade must not expose too much false lean, or "over score" the loin's ham end, i.e., beyond the desired "silver dollar"-size score.

Now, turning to the method of forming the various Z-blades and J-blades of the present disclosure, it will be understood that the blades are preferably formed of D-2 steel material, die-stamped rather than hand-formed (as in the prior art) for greater accuracy and consistency, and are heat treated for greatest longevity. The preferred method for forming the respective blades of the present disclosure, thus, includes the following steps:

(a) preliminarily, when forming a tabbed-style J-blade, form a laser cut, or mill cut as desired, of the profile of the blade and attached tab, all as an integral unit formed from one piece of metal stock (such that the tab member is not a weaker piece due to being welded later on to a separate blade member, as was done in the prior art);

(b) mill the outer blade profile (either style of blade), on a milling machine;

(c) machine the milled blades' overall cutting edge, whether as a double or single bevel edge, and whether as an inner or outer single bevel edge;

(d) anneal the machined blades, so as to soften them, by subjecting them in a preferred temperature range of from approximately 1060° F. to 1080° F., in the preferred time range from approximately 85–95 minutes;

(e) die-stamp the annealed blades, so as to form the actual accurate curves, angle bends, and overall blade profile to the respective Z- and J-blades;

(f) heat treat the die-stamped blades, to within the range on the Rockwell scale of between approximately R.C. 44–54;

(g) quality control check the blade profile of the heat-treated blades, to make sure the cutting edge profile has not changed during the earlier heat treatment step; and (h) polish all surfaces of the blades to generally a substantially flawless mirror-like finish, namely to a polished surface finish within the preferred range from approximately 4 to 32 microinches.

Thereafter, the finished and polished blades are wrapped and shipped to the customer, whereupon the customer grinds on their own final cutting edge, to their own specific edge grinding specifications and desires. They can also then subsequently re-sharpen the blade over its lifetime of use.

Due to the foregoing method of forming the present Z- and J-blades, a substantially superior blade member is obtained. For example, contrary to the rough surface finish established on the known prior art blades, the mirror-like polished surface finish found on the blades of the present disclosure helps to substantially reduce side load forces created by the blades as they cut through the meat carcasses. This is because the polished surface finish creates less drag on the blade-related machine components. This in turn substantially reduces blade wear, and blade-related component wear for the loin puller machines, thereby resulting in increased savings in maintenance downtime and replacement parts.

Further, the present tabbed-style J-blades are formed by laser cutting (or mill-cutting, as desired) both the blade and the tab as a single unit, i.e. all formed as an integral piece from one piece of metal stock. This is contrary to the prior art method of welding and braising on the tab as a separate item to the blade. Thus, due to that difference, the present one-piece tabbed-style J-blades has a substantially longer useful life, as there is no problem in having a welded tab portion prematurely break off from the remaining blade portion. Further, by heat treating the blades to be within the R.C. 44–54 range, the present blades are substantially stronger and result in a longer useful life. Yet further, as a result of die-stamping the curves and bends of the present Z- and J-blades, instead of hand forming then as done with the prior art blade, a very accurate, and consistently-formed, blade portion is achieved.

By permitting with the presently-disclosed blades an additional two tenths of an inch of fatback layer to remain on the belly (which around the time of filing the subject application was running approximately $1.23 per pound, as contrasted to the then current price for fat hand trimmings off the loin of only $0.46 per pound), the extra two tenths of an inch, across the entire length of the pork belly, times typically some 1200 carcass pieces per hour, times two loins per animal, times the typical 16-hour per day shifts of such pork carcass processing operations, results in additional revenue to the processor of literally tens of thousands of dollars per day. Similarly, substantial revenue savings, in effect, occurs by reducing the amount of needed later "hand trimming" of excess fatback over the loin eye meat.

From the foregoing, it is believed that those skilled in the art will readily appreciate the unique features and advantages of the present disclosure over the previous types of dual loin knife blades for meat processing operations. Further, the foregoing detailed description has been given for clearness of understanding only, and no unnecessary limitation should be understood therefrom, as modifications will be obvious to those skilled in the art.

What is claimed is:

1. A Z-blade apparatus for use in a dual blade loin knife assembly of a loin puller machine to create a pulled loin portion, comprising:
   an elongated blade member having distinct blade portions along its length including, in order,
   an upper mount portion adapted to mount to a blade mounting block,
   an upper central portion normally not engaged to a meat carcass during operation,
   a lower central portion normally engaged to a meat carcass during operation, and
   a lower mount portion adapted to mount to a blade mounting block,
   at least the upper central and lower central portions formed with a cutting edge,
   the lower central portion formed of further portions including a shelf portion adapted to create a cut belly shelf on the carcass, and a belly cut portion adapted to cut off the belly,
   the shelf portion further comprising an upper shelf portion adapted to divide the finger lean meat and cut adjacent the feather bones, and a lower shelf portion adapted to cut closely adjacent, but not into, the loin eye meat of the carcass, and
   the shelf portion having a minimum length greater than 2.5 inches and a maximum length no more than 2.7 inches.

2. The Z-blade apparatus of claim 1, wherein each of the upper and lower shelf portions are formed of substantially straight blade portions separated by an angle bend.

3. The Z-blade apparatus of claim 2, wherein the angle of the angle bend is within the range of approximately 9° to 13°.

4. The Z-blade apparatus of claim 2 wherein the angle bend is formed from a radius within the range of approximately 4.8845 to 4.9445 inches.

5. The Z-blade apparatus of claim 2, wherein the substantially straight upper shelf portion has a length within the range of approximately 0.640 inch to 0.710 inch.

6. The Z-blade apparatus of claim 2, wherein the substantially straight lower shelf portion has a length within the range of approximately 0.531 inch to 0.591 inch.

7. The Z-blade apparatus of claim 1, wherein the upper and lower shelf portions are formed as a unitary curved blade portion having an overall radius within the range of approximately 7.257 inches to 7.317 inches.

8. The Z-blade apparatus of claim 1, wherein the upper and lower shelf portions are formed as a unitary curved blade portion.

9. The Z-blade apparatus of claim 1 wherein the curved blade portion has an overall radius within the range of approximately 7.257 inches to 7.317 inches.

10. A Z-blade apparatus for use in a dual blade loin knife assembly of a loin puller machine to create a pulled loin portion, comprising:
    an elongated blade member having distinct blade portions along its length including, in order,
    an upper mount portion adapted to mount to a blade mounting block,
    an upper central portion normally not engaged to a meat carcass during operation,
    a lower central portion normally engaged to a meat carcass during operation, and
    a lower mount portion adapted to mount to a blade mounting block,
    at least the upper central and lower central portions formed with a cutting edge,
    the lower central portion formed of further portions including a shelf portion adapted to create a cut belly shelf on the carcass, and a belly cut portion adapted to cut off the belly,
    the shelf portion further comprising an upper shelf portion adapted to divide the finger lean meat and cut adjacent the feather bones, and a lower shelf portion adapted to cut closely adjacent, but not into, the loin eye meat of the carcass, and
    an angle between the upper shelf portion relative to the upper central blade portion formed within the range of approximately 107° to 111°.

11. The Z-blade apparatus of claim 10, wherein the angle between the upper central portion and the upper shelf portion is formed of a radius within the range of approximately 0.220 inch to 0.280 inch.

12. The Z-blade apparatus of claim 10, wherein each of the upper and lower shelf portions are formed of substantially straight blade portions separated by an angle bend.

13. The Z-blade apparatus of claim 10, wherein the upper and lower shelf portions are formed as a unitary curved blade portion having an overall radius within the range of approximately 7.257 inches to 7.317 inches.

14. The Z-blade apparatus of claim 10, wherein the angle between the lower shelf portion relative to the belly cut portion is formed of a radius within the range of approximately 0.220 inch to 0.280 inch.

15. The Z-blade apparatus of claim 10, wherein the angle between the lower shelf portion relative to the belly cut portion is formed within the range of approximately 117.2° and 121.8°.

16. A Z-blade apparatus for use in a dual blade loin knife assembly of a loin puller machine to create a pulled loin portion, comprising:
    an elongated blade member having distinct blade portions along its length including, in order,
    an upper mount portion adapted to mount to a blade mounting block,
    an upper central portion normally not engaged to a meat carcass during operation,
    a lower central portion normally engaged to a meat carcass during operation, and
    a lower mount portion adapted to mount to a blade mounting block,
    at least the upper central and lower central portions formed with a cutting edge,
    the lower central portion formed of further portions including a shelf portion adapted to create a cut belly shelf on the carcass, and a belly cut portion adapted to cut off the belly,
    the shelf portion further comprising an upper shelf portion adapted to divide the finger lean meat and cut adjacent the feather bones, and a lower shelf portion adapted to cut closely adjacent, but not into, the loin eye meat of the carcass, and
    an angle between the lower shelf portion relative to the belly cut portion formed within the range of approximately 117.2° and 121.8°.

17. The Z-blade apparatus of claim 16, wherein each of the upper and lower shelf portions are formed of substantially straight blade portions separated by an angle bend.

18. The Z-blade apparatus of claim 16, wherein the upper and lower shelf portions are formed as a unitary curved blade portion having an overall radius within the range of approximately 7.257 inches to 7.317 inches.

19. The Z-blade apparatus of claim 16, wherein the angle between the upper shelf portion relative to the upper central blade portion is formed within the range of approximately 107° to 111°.

20. The Z-blade apparatus of claim 19, wherein the angle between the upper shelf portion relative to the belly cut portion is formed of a radius within the range of approximately 0.220 inch to 0.280 inch.

21. The Z-blade apparatus of claim 16, wherein the angle between the lower shelf portion relative to the belly cut portion is formed of a radius within the range of approximately 0.220 inch to 0.280 inch.

22. A Z-blade apparatus for use in a dual blade loin knife assembly of a loin puller machine to create a pulled loin portion, comprising:
    an elongated blade member having distinct blade portions along its length including, in order,
    an upper mount portion adapted to mount to a blade mounting block,
    an upper central portion normally not engaged to a meat carcass during operation,
    a lower central portion normally engaged to a meat carcass during operation, and
    a lower mount portion adapted to mount to a blade mounting block,
    at least the upper central and lower central portions formed with a cutting edge,
    the lower central portion formed of further portions including a shelf portion adapted to create a cut belly shelf on the carcass, and a belly cut portion adapted to cut off the belly,
    the shelf portion further comprising an upper shelf portion adapted to divide the finger lean meat and cut adjacent the feather bones, and a lower shelf portion adapted to cut closely adjacent, but not into, the loin eye meat of the carcass, and
    the shelf portion being non-planar.

23. The Z-blade apparatus of claim 22, wherein each of the upper and lower shelf portions are formed of substantially straight blade portions separated by an angle bend.

24. The Z-blade apparatus of claim 23, wherein the angle of the angle bend is within the range of approximately 9° to 13°.

25. The Z-blade apparatus of claim 24 wherein the angle bend is formed from a radius within the range of approximately 4.8845 to 4.9445 inches.

26. The Z-blade apparatus of claim 23, wherein the substantially straight upper shelf portion has a length within the range of approximately 0.640 inch to 0.710 inch.

27. The Z-blade apparatus of claim 23, wherein the substantially straight lower shelf portion has a length within the range of approximately 0.531 inch to 0.591 inch.

* * * * *